United States Patent [19]
Dorney

[11] Patent Number: 6,029,651
[45] Date of Patent: Feb. 29, 2000

[54] HOT CUP ADAPTED TO RETAIN FLUID CONTENTS HEATED FOR EXTENDED PERIODS OF TIME

[76] Inventor: Peter Dorney, 256 S. Lake Sterling Ct., Castle Berry, Fla. 32107

[21] Appl. No.: 09/292,731

[22] Filed: Apr. 15, 1999

[51] Int. Cl.⁷ ........................................................ F24J 1/00
[52] U.S. Cl. ................................ 126/263.07; 126/263.01; 126/263.03
[58] Field of Search ......................... 126/263.01, 263.05, 126/263.06, 263.07, 263.08, 263.09, 263.1

[56] References Cited

U.S. PATENT DOCUMENTS

| | | | |
|---|---|---|---|
| 5,628,304 | 5/1997 | Freiman | 126/263.05 |
| 5,809,786 | 9/1998 | Scudder et al. | 126/263.01 |

Primary Examiner—Carroll Dority

[57] ABSTRACT

Disclosed is a hot cup system. The system has a generally cylindrical exterior member with a cylindrical side wall and with an open upper end and an open lower end. The exterior member is molded from a thermally insulating elastomeric material. The system also has a generally cylindrical interior member with a cylindrical side wall with an open upper end and a lower end with a generally planar circular lower portion. The lower portion is formed with laterally spaced downwardly extending parallel projections. The interior member is fabricated of a thermally conductive metallic material. A circular base is next provided with a central section extending downwardly therefrom. The base is fabricated of a resilient clear elastomeric material and is coupled to the interior surface of the exterior member adjacent to the lower end thereof. A chamber is formed between the interior member and exterior member and base. A heat generating fluid is located within the chamber. A generally hemispherically shaped trigger is formed of a flexible metallic material located above the central section of the base.

6 Claims, 3 Drawing Sheets

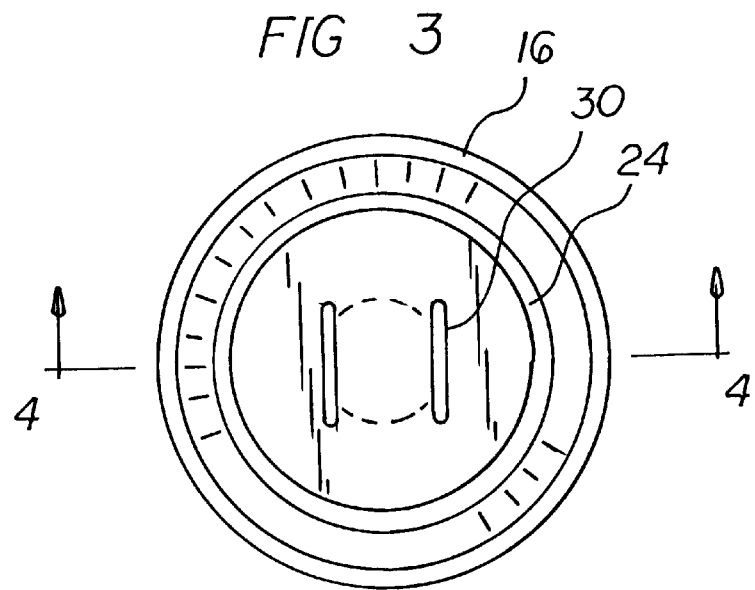
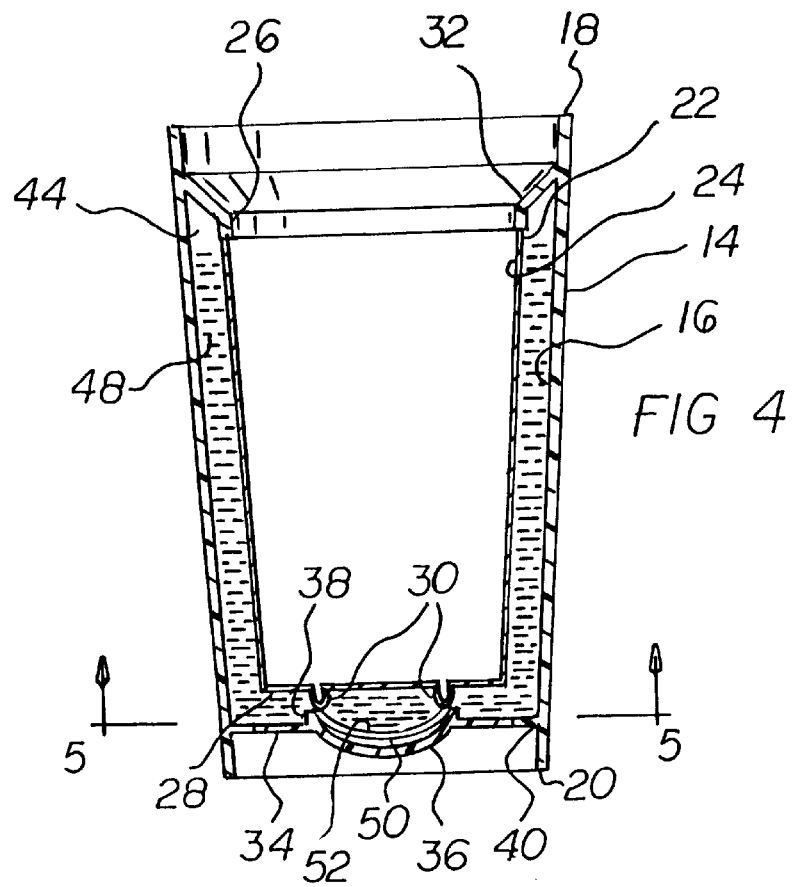

HOT CUP ADAPTED TO RETAIN FLUID CONTENTS HEATED FOR EXTENDED PERIODS OF TIME

BACKGROUND OF THE INVENTION

1. Field of the Invention

The present invention relates to a hot cup adapted to retain fluid contents heated for extended periods of time and more particularly pertains to self-heating a cup through chemical constituents to retain the drinkability of fluids within the cup.

2. Description of the Prior Art

The use of cups and heating devices of known designs and configurations is known in the prior art. More specifically, cups of known designs and configurations heretofore devised and utilized for the purpose of heating fluids from a heat-generating container are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,388,565 to Ou On discloses a Self-Heating Container System. U.S. Pat. No. 4,506,654 to Zellweger et al. discloses a Heating Device. U.S. Pat. No. 4,424,798 to Volk discloses a Self-Heating Container. U.S. Pat. No. 3,683,889 to Hoffman discloses a Heating Container. U.S. Pat. No. 5,662,096 to Walters discloses a Trigger to Activate Supercooled Aqueous Salt Solution for Use in a Heat Pack. U.S. Pat. No. 5,373,856 to Mifune et al. discloses a Water Heater. U.S. Pat. No. 4,834,065 to McQuade discloses a Field Cooker. U.S. Pat. No. 4,829,981 to Burrell discloses a Portable Warming Apparatus For a Cup. U.S. Pat. No. 3,790,028 to Gardner, Jr. et al. discloses a Hot Liquid Dispenser. U.S. Pat. No. 4,424,798 to Volk discloses a Self-Heatable Container. U.S. Pat. No. 4,506,654 to Zellweger et al. discloses a Heating Device. U.S. Pat. No. 4,829,981 to Burrell discloses a Portable Warming Apparatus for a Cup. U.S. Pat. No. 4,896,655 to Urso discloses a Versatile Heater for Under-Blanket Heating, Tent Heating, and Food Heating. U.S. Pat. No. 5,303,691 to Armistead discloses a Portable Miniature Camp Stove. U.S. Pat. No. 5,373,836 to Mifune et al. discloses a Water Heater. U.S. Pat. No. 5,388,565 to Ou discloses a Self-Heating Container System. U.S. Pat. No. 5,628,304 to Freiman discloses a Self-Heating Container. U.S. Pat. No. 3,583,307 to Lee discloses a Cooking Apparatus.

While these devices fulfill their respective, particular objectives and requirements, the aforementioned patents do not describe hot cup adapted to retain fluid contents heated for extended periods of time as disclosed herein.

In this respect, the hot cup adapted to retain fluid contents heated for extended periods of time according to the present invention substantially departs from the conventional concepts and designs of the prior art, and in doing so provides an apparatus primarily developed for the purpose of self-heating a cup through chemical constituents to retain the drinkability of fluids within the cup.

Therefore, it can be appreciated that there exists a continuing need for a new and improved hot cup adapted to retain fluid contents heated for extended periods of time which can be used for self-heating a cup through chemical constituents to retain the drinkability of fluids within the cup. In this regard, the present invention substantially fulfills this need.

SUMMARY OF THE INVENTION

In view of the foregoing disadvantages inherent in the known types of cups of known designs and configurations now present in the prior art, the present invention provides an improved hot cup adapted to retain fluid contents heated for extended periods of time. As such, the general purpose of the present invention, which will be described subsequently in greater detail, is to provide a new and improved hot cup adapted to retain fluid contents heated for extended periods of time and method which has all the advantages of the prior art and none of the disadvantages.

To attain this, the present invention essentially comprises a new and improved hot cup adapted to retain fluid contents heated for extended periods of time. The hot cup is formed with a generally cylindrical exterior member, the exterior member having a cylindrical side wall and with an open upper end and an open lower end, the exterior member being injection molded from a thermally insulating elastomeric material, preferably high density polyethylene; a generally cylindrical interior member, the interior member having a cylindrical side wall with an open upper end and a lower end with a generally planar circular lower portion formed with two laterally spaced downwardly extending parallel projections, the interior member being fabricated of a thermally conductive metallic material, preferably stainless steel; a circular base with an essentially hemispherical central section extending downwardly therefrom with a cylindrical extension projecting upwardly therefrom, the base being fabricated of a resilient clear elastomeric material, preferably polyethylene, with the base having a periphery with a spin weld coupled to the interior surface of the exterior member adjacent to the lower end thereof; a chamber formed between the interior member and exterior member and base; a heat generating fluid, preferably sodium acetate, located within the chamber; and a generally hemispherically shaped trigger formed of a flexible metallic material, preferably aluminum, located between the central section of the base and the parallel projections and with upwardly extending ribs which when flexed will activate the fluid to generate heat.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hot cup adapted to retain fluid contents heated for extended periods of time which has all of the advantages of the prior art cups of known designs and configurations and none of the disadvantages.

It is another object of the present invention to provide a new and improved hot cup adapted to retain fluid contents heated for extended periods of time which may be easily and efficiently manufactured and marketed.

It is further object of the present invention to provide a new and improved hot cup adapted to retain fluid contents heated for extended periods of time which is of durable and reliable constructions.

An even further object of the present invention is to provide a new and improved hot cup adapted to retain fluid contents heated for extended periods of time which is susceptible of a low cost of manufacture with regard to both materials and labor, and which accordingly is then susceptible of low prices of sale to the consuming public, thereby making such hot cup adapted to retain fluid contents heated for extended periods of time economically available to the buying public.

Even still another object of the present invention is to provide a hot cup adapted to retain fluid contents heated for extended periods of time for self-heating a cup through chemical constituents to retain the drinkability of fluids within the cup.

Lastly, it is an object of the present invention to provide a new and improved hot cup system. The system has a generally cylindrical exterior member with a cylindrical side wall and with an open upper end and an open lower end. The exterior member is molded from a thermally insulating elastomeric material. The system also has a generally cylindrical interior member with a cylindrical side wall with an open upper end and a lower end with a generally planar circular lower portion. The lower portion is formed with laterally spaced downwardly extending parallel projections. The interior member is fabricated of a thermally conductive metallic material. A circular base is next provided with a central section extending downwardly therefrom. The base is fabricated of a resilient clear elastomeric material and is coupled to the interior surface of the exterior member adjacent to the lower end thereof. A chamber is formed between the interior member and exterior member and base. A heat generating fluid is located within the chamber. A generally hemispherically shaped trigger is formed of a flexible metallic material located above the central section of the base.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view of the heat cup shown in the prior Figures.

FIG. 4 is a cross-sectional view taken along line 4—4 of FIG. 3.

The same reference numerals refer to the same parts through the various Figures.

DESCRIPTION OF THE PREFERRED EMBODIMENT

Figure 1:
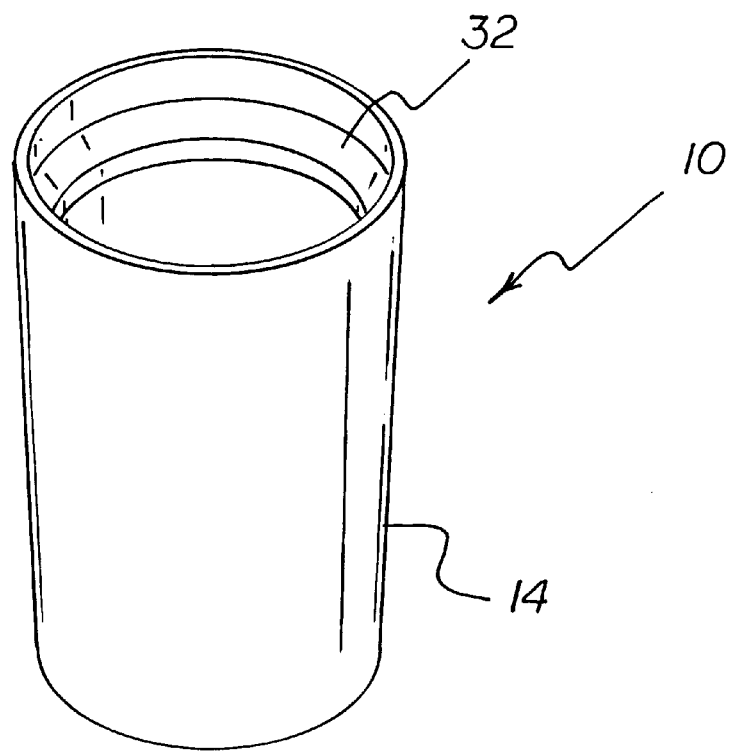
FIG. 1 is a perspective view of the new and improved hot cup adapted to retain fluid contents heated for extended periods of time constructed in accordance with the principles of the present invention.
Figure 2:
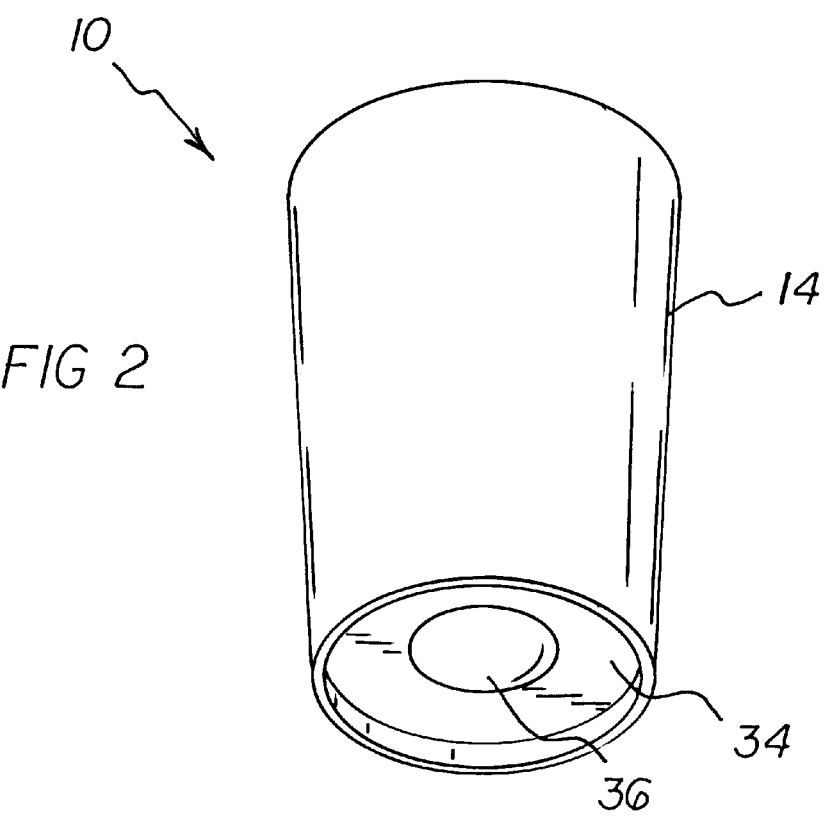
FIG. 2 is a perspective view similar to FIG. 1 but taken from the lower end thereof.
Figure 5:
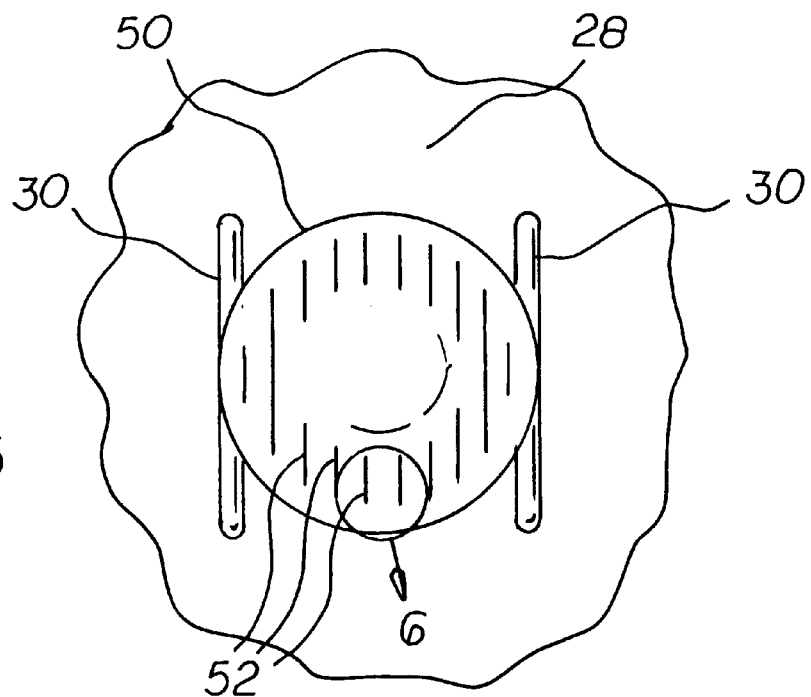
FIG. 5 is a cross-sectional view taken along line 5—5 of FIG. 4.
Figure 6:
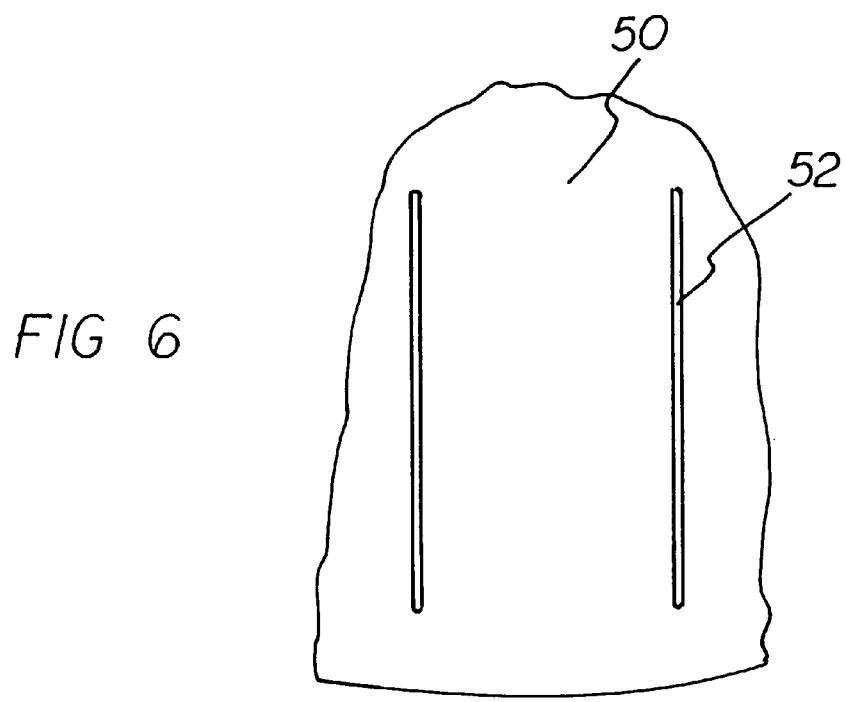
FIG. 6 is an enlarged elevational view taken at circle 6 of FIG. 5.

With reference now to the drawings, and in particular to FIG. 1 thereof, the preferred embodiment of the new and improved hot cup adapted to retain fluid contents heated for extended periods of time embodying the principles and concepts of the present invention and generally designated by the reference numeral 10 will be described.

The present invention, the new and improved hot cup system 10, is adapted to retain fluid contents heated for extended periods of time. The hot cup system is comprised of a plurality of components. Such components in their broadest context include an exterior member, an interior member, a circular base, a chamber formed between the interior and exterior members and base, a heat generating fluid, and a trigger. Such components are individually configured and correlated with respect to each other so as to attain the desired objective.

The first major component of the new and improved hot cup system is a generally cylindrical exterior member 14. The exterior member is formed with a cylindrical side wall 16 and with an open upper end 18 and an open lower end 20. The exterior member is injection molded from a thermally insulating elastomeric material, preferably high density polyethylene.

The next component of the system is a generally cylindrical interior member 22. The interior member has a cylindrical side wall 24 with an open upper end 26 and a lower end. The lower end has a generally planar circular lower portion 28 formed with two laterally spaced downwardly extending parallel projections 30. The interior member is fabricated of a thermally conductive metallic material, preferably stainless steel. The interior and exterior members are coupled adjacent to their tops by an annular flange 32.

A circular base 34 is next provided. The base is formed with an essentially hemispherical central section 36 extending downwardly therefrom with a cylindrical extension 38 projecting upwardly therefrom. The base is fabricated of a resilient clear elastomeric material, preferably polypropylene. The base has a periphery with a sonic weld or spin weld 40 coupled to the interior surface of the exterior member adjacent to the lower end thereof.

Another component of the system is a chamber 44 formed between the interior member and exterior member and base.

Also provided is a heat generating fluid 48, preferably sodium acetate, located within the chamber.

Lastly provided as a component of the system 10 is a generally hemispherically shaped trigger 50. The trigger is formed of a flexible metallic material, preferably stainless steel. The trigger is located between the central section of the base and the parallel projections 52 and is provided with upwardly extending ribs which when flexed will activate the fluid to generate heat.

From the foregoing, it should be appreciated that the heat cup of the present invention is made by enclosing supercoolable aqueous sodium acetate solution together with a metallic activator strip in a sealed cup with a flexible base. The activator strip is a flexible metal strip having one or more ribs extending upwardly therefrom. To prepare the heat cup for activation, its contents are first heated to a temperature above the melting point of sodium acetate to completely melt it. Thereafter, the sodium acetate solution is supercooled. Activation or crystallization of the sodium acetate with the generation of heat is produced by flexing the activator strip. The thermally insulating material of the exterior member precludes a user from burning his or her hand when using the cup while the thermally conductive material on the interior layer will function to heat coffee or other contents therein during use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved hot cup system adapted to retain fluid contents heated for extended periods of time comprising, in combination:

a generally cylindrical exterior member, the exterior member having a cylindrical side wall and with an open upper end and an open lower end, the exterior member being injection molded from a thermally insulating elastomeric material, preferably high density polyethylene;

a generally cylindrical interior member, the interior member having a cylindrical side wall with an open upper end and a lower end with a generally planar circular lower portion formed with two laterally spaced downwardly extending parallel projections, the interior member being fabricated of a thermally conductive metallic material, preferably stainless steel;

a circular base with an essentially hemispherical central section extending downwardly therefrom with a cylindrical extension projecting upwardly therefrom, the base being fabricated of a resilient clear elastomeric material, preferably polyethylene, with the base having a periphery with a sonic weld or spin weld coupled to the interior surface of the exterior member adjacent to the lower end thereof;

a chamber formed between the interior member and exterior member and base;

a heat generating fluid, preferably sodium acetate, located within the chamber; and a generally hemispherically shaped trigger formed of a flexible metallic material, preferably aluminum, located between the central section of the base and the parallel projections and with upwardly extending ribs which when flexed will activate the fluid to generate heat.

2. A hot cup system comprising:

a generally cylindrical exterior member, the exterior member having a cylindrical side wall and with an open upper end and an open lower end, the exterior member being molded from a thermally insulating elastomeric material;

a generally cylindrical interior member, the interior member having a cylindrical side wall with an open upper end and a lower end with a generally planar circular lower portion formed with laterally spaced downwardly extending parallel projections, the interior member being fabricated of a thermally conductive metallic material;

a circular base with a central section extending downwardly therefrom, the base being fabricated of a resilient clear elastomeric material, with the base coupled to the interior surface of the exterior member adjacent to the lower end thereof;

a chamber formed between the interior member and exterior member and base;

a heat generating fluid located within the chamber; and a generally hemispherically shaped trigger formed of a flexible metallic material located above the central section of the base.

3. The hot cup system as set forth in claim 2 wherein the insulating elastomeric material is high density polyethylene.

4. The hot cup system as set forth in claim 2 wherein the interior member is fabricated of stainless steel.

5. The hot cup system as set forth in claim 2 wherein the base is fabricated of polyethylene.

6. The hot cup system as set forth in claim 2 wherein the flexible metallic material includes parallel ridges extending upwardly therefrom.

* * * * *